United States Patent
Kessler

(10) Patent No.: US 6,323,611 B1
(45) Date of Patent: Nov. 27, 2001

(54) CIRCUIT FOR OPERATING AN ELECTRIC MOTOR

(75) Inventor: Martin Kessler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 490 days.

(21) Appl. No.: 08/793,365

(22) PCT Filed: Aug. 24, 1995

(86) PCT No.: PCT/DE95/01123

§ 371 Date: Feb. 24, 1997

§ 102(e) Date: Feb. 24, 1997

(87) PCT Pub. No.: WO96/08066

PCT Pub. Date: Mar. 14, 1996

(30) Foreign Application Priority Data

Sep. 9, 1994 (DE) ................................. 44 32 058

(51) Int. Cl.[7] .................................................. H02P 7/06
(52) U.S. Cl. ........................ 318/430; 318/434; 318/461; 388/903; 388/921
(58) Field of Search ...................... 318/430–434, 318/461, 463, 471, 473, 484; 388/903, 921, 934

(56) References Cited

U.S. PATENT DOCUMENTS

| | | | |
|---|---|---|---|
| 3,716,772 | * | 2/1973 | Larson . |
| 3,936,711 | * | 2/1976 | Gay . |
| 4,063,112 | * | 12/1977 | Dumbeck ............................. 318/490 |
| 4,307,325 | * | 12/1981 | Saar . |
| 4,314,186 | * | 2/1982 | Gille et al. ............................ 318/434 |
| 4,514,670 | * | 4/1985 | Fassel et al. ......................... 318/467 |
| 4,528,898 | * | 7/1985 | Sharp et al. . |
| 4,541,029 | * | 9/1985 | Ohyama . |
| 4,641,067 | * | 2/1987 | Iizawa et al. ........................ 318/287 |
| 5,317,244 | * | 5/1994 | Ishikura ............................... 318/254 |
| 5,585,705 | * | 12/1996 | Brieden ................................ 318/467 |

FOREIGN PATENT DOCUMENTS

| | | | |
|---|---|---|---|
| 2228715 | * | 12/1972 | (DE) . |
| 3034118 | | 3/1982 | (DE) . |
| 0413893 | * | 2/1991 | (EP) . |
| 60-5797 | * | 1/1985 | (JP) . |

* cited by examiner

Primary Examiner—Bentsu Ro
(74) Attorney, Agent, or Firm—Venable; George H. Spencer; Allen Wood

(57) ABSTRACT

A circuit for operating an electric motor (11) includes a monitoring arrangement (24) for ascertaining an increased load state of the electric motor (11). The monitoring arrangement (24) compares an rpm difference ($N_D$) between a predetermined nominal rpm value ($N_{SOLL}$) and an actual rpm value signal ($N_{IST}$) with a predetermined limit value. If the limit value is exceeded, the monitoring arrangement (24) emits an overload signal (25) that reduces the nominal rpm value ($N_{SOLL}$) or a control variable ($S_N$) supplied to a drive stage (18), or drops it to zero. The circuit is particularly suited for use with a fan, in which instance the ventilator (22) cools the electric motor (11) and/or the drive stage (18).

18 Claims, 1 Drawing Sheet

CIRCUIT FOR OPERATING AN ELECTRIC MOTOR

BACKGROUND OF THE INVENTION

Related Art

The invention is based on a circuit for operating an electric motor, of the type having an arrangement that produces a signal serving as a measure for the rpm of electric motor and having a monitoring arrangement for detecting an increased load state of the electric motor. DE-PS 30 34 118 discloses a generic circuit that has a sensor which produces a signal serving as a measure for the rpm of the electric motor. The known circuit includes a monitoring arrangement for ascertaining an increased load state of the electric motor; the arrangement monitors rpm, comparing the actual rpm determined from the sensor signal to a predetermined limit value. The limit value is derived from an initial actual rpm value established after a predetermined time following startup of the known circuit. The known circuit for operating an electric motor is used in electronic monitoring of an opening and closing process of electrically-operated motor vehicle parts. The limit value is tailored to the task of detecting jammed objects or body parts. The known circuit is not provided with an increased load state of the electric motor, or of a provided end stage, that can lead to a thermal overload of these parts.

SUMMARY OF THE INVENTION

It is the object of the invention to provide a circuit for operating a motor that in particular assures the protection of an end or drive stage and/or the electric motor against thermal overload.

The object is accomplished by a circuit of the above mentioned type which is characterized in that the monitoring arrangement compares an rpm difference, between a predetermined nominal rpm value and the actual rpm determined from the actual rpm signal, to a predetermined limit value, and emits an overload signal if the limit value is exceeded.

A monitoring arrangement provided in accordance with the invention compares the difference between a provided nominal rpm value and an actual rpm value determined from a sensor signal. If the limit value is exceeded, the monitoring arrangement emits an overload signal.

The concept underlying the circuit of the invention is that, in the steady operating state, the difference between the predetermined nominal rpm value and the detected actual rpm value either lies within specific limits as a function of a predetermined rpm regulator or is zero. Sluggishness of the electric motor or of a part driven by the motor, as well as complete blockage, cause the limit value to be exceeded, and thus lead to triggering of the overload signal.

An advantage of the circuit of the invention for operating an electric motor is that an increased load state or complete blockage can be recognized with electrical signals that can be detected with simple means. No further sensors, such as a temperature sensor, are necessary.

The circuit of the invention for operating an electric motor is particularly suited for use in a fan, in which instance the fan is used to cool an electric motor and/or the drive stage simultaneously.

In comparison to establishing a limit value based on a predetermined rpm value, the circuit of the invention for operating an electric motor has the advantage that both the electric motor and the drive stage only need to be designed for low thermal stress.

A particularly advantageous modification of the circuit of the invention provides that the limit value for the rpm difference, which is provided in the monitoring arrangement, is determined as a function of the predetermined nominal rpm value. With this measure, the limit value can be adapted to different operating relationships.

An advantageous embodiment provides that the predetermined nominal rpm value is reduced when the overload signal is emitted. With another advantageous measure, when the overload signal occurs, a control variable of a controlled voltage source is reduced, which source is instrumental in the actuation of the drive stage. Implementing one of these measures ensures that, despite an increased load state, the electric motor can continue to be operated reliably without the threat of thermal destruction.

In a particularly advantageous modification, the monitoring arrangement does not emit the overload signal until a predeterminable period of time has passed. The predeterminable time is a delay time that takes into account the run-up of the electric motor, for example starting from the off state. The unsteady state that occurs during run-up and could lead to erroneous generation of the overload signal can be kept in check with this measure.

Another advantageous modification provides that the overload signal is suppressed following a predetermined time. If the electric motor is further overloaded, the overload signal is emitted again. In this operation, periodic attempts are made to turn on the electric motor. The times during which the overload signal occurs or is suppressed are advantageously measured such that, despite an overload or complete blockage of the electric motor, the average power is limited to a value that does not represent a danger of thermal overload of the electric motor and/or the drive stage.

Further advantageous embodiments and advantageous modifications discussed in the description below.

BRIEF DESCRIPTION OF THE DRAWING

The drawing FIGURE shows a block diagram of a circuit of the invention for operating an electric motor.

DESCRIPTION OF THE PREFERRED EMBODIMENTS

Figure 1:
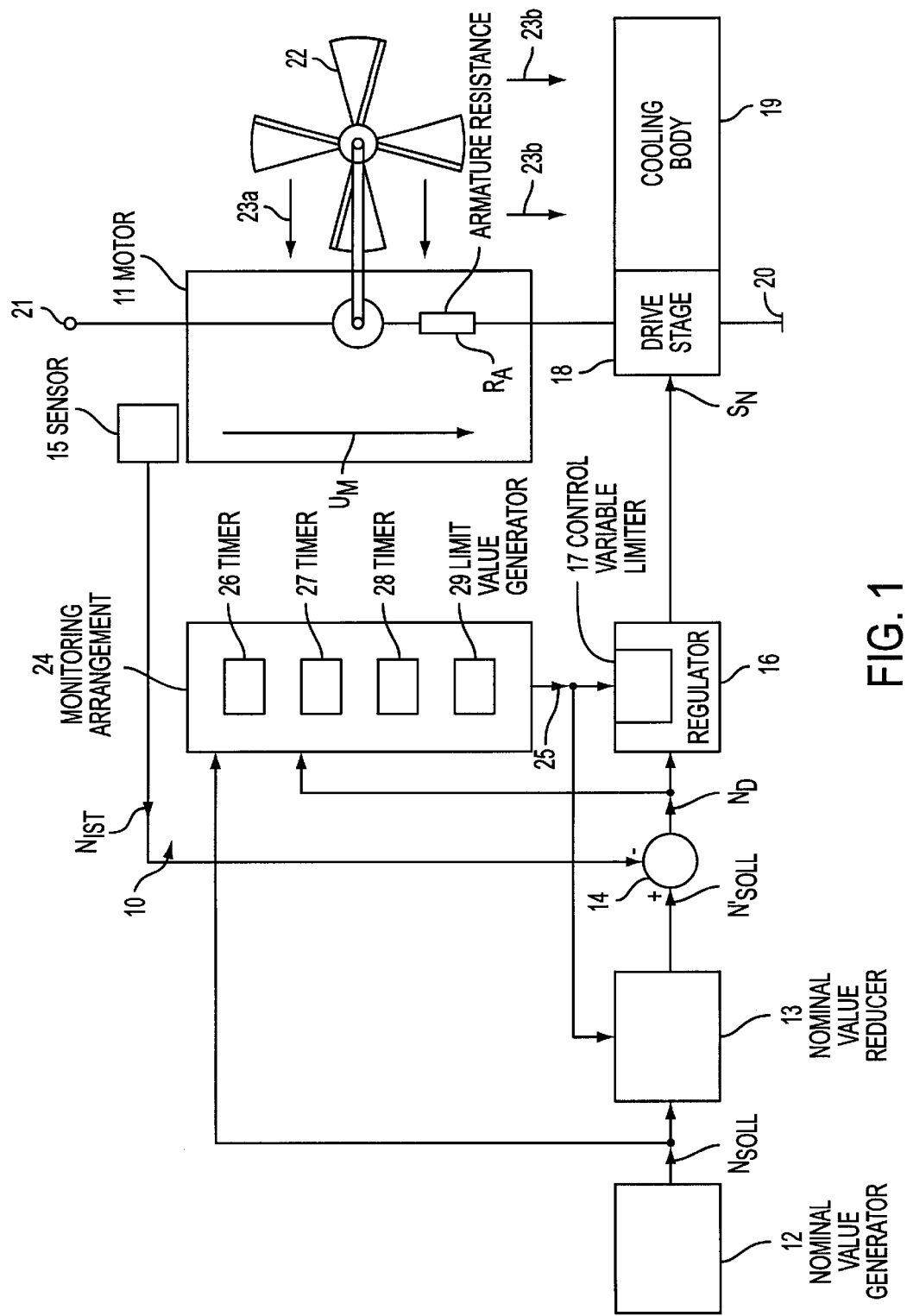

The FIGURE shows an rpm-regulating circuit 10 that regulates the rpm of an electric motor 11 at a predetermined command or rpm value $N_{SOLL}$. The nominal rpm value $N_{SOLL}$, is produced by a command or nominal value generator 12. The nominal value generator 12 transmits the nominal rpm value $N_{SOLL}$ to a nominal value reducer 13, which conducts the nominal rpm value $N_{SOLL}$ further, as a limited nominal rpm value $N'_{SOLL}$, to an adder 14. The adder 14 forms an rpm difference $N_D$ between the limited nominal rpm value $N'_{SOLL}$ and an actual rpm value signal $N_{IST}$. The actual rpm value signal $N_{IST}$ is a measure for the rpm of the electric motor 11 that is produced by an rpm sensor 15.

The adder 14 transmits the rpm difference $N_D$ to a regulator 16 that determines a control variable $S_N$. The regulator 16 includes a control variable limiter 17. The control variable $S_N$ enters an end stage or drive stage 18 connected to a heat sink or cooling body 19. The drive stage 18 connects the electric motor 11 to an energy source, not shown in detail, by way of a first connection 20 and a second connection 21. The drive stage 18 is controlled with the control variable $S_N$ in such a way that the rpm of the electric motor 11 corresponds to the predetermined nominal rpm value $N_{SOLL}$.

A current flowing through the electric motor 11 leads to a motor voltage $U_M$, which corresponds to the voltage drop at an armature resistance $R_A$, to which an electric-motor countervoltage (EMK) is added.

The electric motor 11 actuates a ventilator 22 that emits a first air current 23a in the direction of the electric motor 11 and a second air current 23b in the direction of the cooling body 19.

The rpm difference $N_D$ and the nominal rpm value $N_{SOLL}$ are supplied to a monitoring arrangement 24 that produces an overload signal 25, which is transmitted to both the nominal value reducer 13 and the control variable limiter 17. The monitoring arrangement 24 includes a first, a second and a third timer 26, 27 and 28, respectively, and a limit value generator 29.

The illustrated circuit of the invention for operating the electric motor 11 operates as follows:

The rpm-regulating circuit 10 regulates the rpm of the electric motor 11 in such a way that the rpm difference $N_{IST}$ between the nominal rpm value $N_{SOLL}$ produced by the nominal value generator 12 and the actual rpm value signal $N_{IST}$ produced by the rpm sensor 15 is as low as possible, or is even zero. To regulate the rpm, the rpm-regulating circuit 10 includes the adder 14, which determines the rpm difference $N_D$, as a deviation, from the actual rpm value signal $N_{IST}$ and the limited nominal rpm value $N'_{SOLL}$. The regulator 16 establishes the control variable $S_N$ as a function of the rpm difference $N_d$. The regulator 16 can be configured in accordance with the extensive background literature on regulating technology, for example as a proportional or proportional-plus-integral regulator. Both analog and digital regulators are suitable. The control variable $S_N$ can be an analog signal that is supplied to the drive stage 18. The control variable $S_N$ is preferably a digital, pulse-width-modulated signal that effects a clocked operation in the drive stage 18. In this clocked operation, the electric motor 11 is connected to the energy source not shown in detail, or completely shut off, in rapid temporal sequence. The result is an average voltage $U_M$, that leads to a specific motor current as a function of the load set by the ventilator 22. The drive stage 18 can be characterized as a controlled voltage source that sets the motor voltage $U_M$ variably at a value at which the rpm difference $N_D$ is as low as possible or is zero. The clocked operation of the drive stage 18 with the pulse width control permits the drive stage 18 to be designed for a switching operation that results in minimal energy loss in the drive stage 18 that must be dissipated via the cooling body 19. The cooling body 19 is either separate and connected to the end stage 18, or a specially-worked component of the drive stage 18.

The rpm of the electric motor 11 is detected by the rpm sensor 15. It is emphasized that the rpm of the ventilator 22 or the rpm of a drive not shown in detail can also be detected instead of the motor rpm. The only essential point is that the rpm sensor 15 produces the actual rpm value signal $N_{IST}$ as a measure for the rpm of the electric motor 11.

The rpm sensor 15 may operate on, for example, an optoelectronic basis. A light barrier is suitable. The rpm sensor 15 preferably operates on a magnetic basis, for example detecting a magnetic field. Hall sensors, magnetoresistive elements or inductive receivers are examples of suitable devices. The detection of commutations signal components in the motor current is also particularly suited. The rpm is preferably detected indirectly through the evaluation of the operating data of the electric motor 11. The rpm is proportional to the induced countervoltage, which in turn can be determined from the motor terminal voltage and the motor current with a known internal resistance.

A feature of the circuit is the monitoring arrangement 24 that compares the rpm difference $N_D$ to the limit value produced by the limit value generator 29. If the rpm difference $N_D$ exceeds the limit value, the monitoring arrangement 24 emits the overload signal 25. The overload signal 25 can trigger a warning signal, for example. In the illustrated embodiment, the overload signal 25 can, for example, lower the nominal rpm value $N_{SOLL}$ predetermined by the nominal value generator 12 by a predetermined amount, or even make it zero, in the nominal value reducer 13. The lowered nominal rpm value $N_{SOLL}$ is characterized as a limited nominal rpm value $N'_{SOLL}$ that is supplied to the adder 14. It is also possible for the overload signal 25 to lower, for example, the control variable $S_N$ of the regulator 16 by a predetermined amount or to zero with the control variable limiter 17 included in the regulator 16.

A particularly advantageous embodiment provides that the limit value produced by the limit value generator 29 is established as a function of the predetermined nominal rpm value $N_{SOLL}$. Therefore, in addition to the rpm difference $N_D$, the nominal rpm value $N_{SOLL}$ is supplied to the monitoring arrangement 24 as an input signal. With a high nominal rpm value $N_{SOLL}$ the limit value is preferably established to be lower than with a lower nominal rpm value $N_{SOLL}$.

Another advantageous embodiment includes the first timer 26 in the monitoring arrangement 24. The first timer 26 is set at a time that corresponds to the run-up of the electric motor 11, for example from standstill to the predetermined normal-rating operation, at which the nominal rpm value $N_{SOLL}$ is reached. During the time predetermined by the first timer 26, emission of the overload signal 25 is suppressed. The first timer 26 recognizes the turning on of the electric motor 11, for example through a change in the presetting of the nominal rpm value $N_{SOLL}$.

The second and third timers 27, 28 permit a periodic, recurring attempt to start up the electric motor 11 despite an ascertained overload state or increased-load state. The second timer 27 starts, for example, simultaneously with the occurrence of the overload signal 25. The time set by the second timer 27 therefore establishes the shutoff time of the electric motor 11 or the time of reduced power. After the time predetermined by the second timer 27 has expired, the overload signal 25 is suppressed during the time predetermined by the third timer 28. Therefore, during the time predetermined by the third timer 28, an attempt is made to resume normal-rating operation of the electric motor 11 with the predetermined nominal rpm value $N_{SOLL}$. A temporary blocked state or temporary sluggishness is identified with this measure, and has no further effects on continued operation. Because the third timer 28 predetermines a turn-on time and the second timer 27 predetermines a shutoff time or the time of reduced power, it is possible to keep thermal overload of both the electric motor 11 the drive stage 18 cooled by the cooling body 19 within preset limits, even if overload occurs during long-term unsteady operation. A suitable setting can be selected, for example, in that the average current $I_M$ flowing through the electric motor 11 is selected to meet the following condition:

$$I_M = T_{ein}/(T_{ein}+T_{aus}) \times (U_{Mmax}/R_A)$$

where $T_{ein}$ is the turn-on time, $T_{aus}$ is the shutoff time and $U_{Mmax}$ is the maximum motor voltage. Thermal overload is precluded with an average motor current set in this way.

A preferred use of the circuit of the invention for operating an electric motor 11 is in a fan, preferably one disposed in a motor vehicle and serving to ventilate the interior. A modification of the use in a fan in accordance with the invention provides that the drive stage 18 and/or the electric motor 11 is or are cooled by the air current 23a 23b of the ventilator 22 itself. With this measure, it is possible to provide an inexpensive end stage 18 whose permissible continuous energy loss can have a lower value than a drive stage 18 that does not benefit from additional cooling. A crucial feature of this modification, therefore, is that, when the electric motor 11 is sluggish or complete blockage exists, the motor current in the drive stage 18 and therefore the energy loss of the drive stage are reduced after the additional cooling by the ventilator 22 has ended.

A transistor, preferably a field-effect transistor, is particularly suited to be the drive stage 18. In a bipolar transistor, the control variable $S_N$ is a control current that flows into the base during analog operation. In a field-effect transistor, the control variable $S_N$ is a control voltage that impinges upon the gate. In all cases, a pulse-width-modulated, digital control variable $S_N$ is provided in clocked operation; this variable operates the drive stage 18 as a controlled voltage source that predetermines the average motor voltage $U_M$.

In principle, it is also possible to operate the circuit of the invention without an rpm-regulating circuit 10. Instead of rpm regulation, an rpm control is provided, with the monitoring arrangement 24 detecting the rpm difference $N_D$ in controlled operation, just as in the former case.

What is claimed is:

1. An improved circuit for operating a DC electric motor, the circuit having an arrangement that produces a signal serving as a measure for the rpm of the electric motor and having a monitoring arrangement for detecting an increased load state of the electric motor, wherein the improvement comprises:
   the monitoring arrangement (24) compares an rpm difference ($N_D$) between a predetermined nominal rpm value ($N_{SOLL}$) and the actual rpm determined from the actual rpm value signal ($N_{IST}$) to a predetermined limit value, and emits an overload signal (25) if the limit value is exceeded.

2. A circuit according to claim 1, wherein the limit value is a function of the predetermined nominal rpm value ($N_{SOLL}$).

3. A circuit according to claim 1, wherein the monitoring arrangement (24) includes a first timer (26) that takes into account a run-up process of the electric motor (11) with respect to setting of the nominal rpm value ($N_{SOLL}$) by suppressing the overload signal (25).

4. A circuit according to claim 1, wherein the arrangement that produces a signal serving as a measure for the rpm includes an rpm sensor.

5. A circuit according to claim 1, wherein the arrangement that produces a signal serving as a measure for the rpm detects the motor current and the motor terminal voltage, and determines the rpm from the detected motor current and the motor terminal voltage.

6. A circuit according to claim 1, in combination with a fan that is driven by the electric motor (11), wherein the circuit further comprises a drive stage (18) for driving the electric motor (11) and the fan cools at least one of the electric motor (11) and the drive stage (18) using air currents.

7. An improved circuit for operating a DC electric motor, the circuit having an arrangement that produces a signal serving as a measure for the rpm of the electric motor and having a monitoring arrangement for detecting an increased load state of the electric motor, wherein the improvement comprises:
   the monitoring arrangement (24) compares an rpm difference ($N_D$) between a predetermined nominal rpm value ($N_{SOLL}$) and the actual rpm determined from the actual rpm value signal ($N_{IST}$) to a predetermined limit value, and emits an overload signal (25) if the limit value is exceeded; and
   the current further comprises a nominal value reducer (13) that receives the overload signal (25) and that lowers the nominal rpm value ($N_{SOLL}$) to a limited nominal rpm value ($N'_{SOLL}$) in response to the overload signal (25).

8. An improved circuit for operating a DC electric motor, the circuit having an arrangement that produces a signal serving as a measure for the rpm of the electric motor and having a drive stage for driving the electric motor in response to a control variable, the circuit additionally having a monitoring arrangement for detecting an increased load state of the electric motor, wherein the improvement comprises:
   the monitoring arrangement (24) compares an rpm difference ($N_D$) between a predetermined nominal rpm value ($N_{SOLL}$) and the actual rpm determined from the actual rpm value signal ($N_{IST}$) to a predetermined limit value, and emits an overload signal (25) if the limit value is exceeded; and
   the circuit further comprises a regulator (16) which generates the control variable ($S_N$) as a function of the rpm difference ($N_D$), the regulator (16) including a control variable limiter (17) that receives the overload signal (25) and that reduces the control variable ($S_N$) supplied to the drive stage (18) to a predetermined value in response to the overload signal (25).

9. An improved circuit for operating an electric motor, the circuit having an arrangement that produces a signal serving as a measure for the rpm of the electric motor and having a monitoring arrangement for detecting an increased load state of the electric motor, wherein the improvement comprises:
   the monitoring arrangement (24) compares an rpm difference ($N_D$) between a predetermined nominal rpm value ($N_{SOLL}$) and the actual rpm determined from the actual rpm value signal ($N_{IST}$) to a predetermined limit value, and emits an overload signal (25) if the limit value is exceeded, and
   the monitoring arrangement (24) includes a timer (27) that limits the duration of the overload signal (25) to a time ($T_{aus}$) predetermined by the timer (27), and a further timer (28) that predetermines a time ($T_{ein}$) during which the overload signal (25) is then suppressed.

10. A circuit according to claim 9, further comprising a drive stage (18) for driving the electric motor (11), and wherein the two times ($T_{aus}$, $T_{ein}$) predetermined by the two timers (27, 28) are measured so as to preclude thermal overload of at least one of the electric motor (11) and the drive stage (18).

11. A circuit for operating a motor in response to a nominal rpm signal, comprising:
   means for producing an actual rpm signal which serves as a measure of the rpm of the motor;
   means for generating a control variable signal which is a function of the difference between the nominal and actual rpm signals;
   means for comparing the difference between the nominal and actual rpm signals to a limit value and generating an overload signal if the difference exceeds the limit value;

means for reducing the control variable signal if the overload signal appears; and means for driving the motor in response to the control variable signal.

12. A circuit according to claim 11, wherein the limit value is a function of the nominal rpm signal.

13. A circuit according to claim 11, wherein the means for generating a control variable signal comprises an adder which receives the nominal and actual rpm signals and generates a different signal from them, and a nominal value reducer which reduces the nominal rpm signal before it is received by the adder if the overload signal appears.

14. A circuit according to claim 11, wherein the means for generating a control variable signal comprises an adder which receives the nominal and actual rpm signals and generates a difference signal from then, and a regulator which generates the control variable signal from the difference signal, the regulator including a control variable limiter which limits the magnitude of the control variable signal if the overload signal appears.

15. A circuit according to claim 11, wherein the means for generating an overload signal comprises a timer which suppresses the overload signal during run-up of the motor.

16. A circuit according to claim 15, wherein the means for generating an overload signal further comprises another timer which limits the duration of the overload signal and an additional timer which then times an interval during which the overload signal is suppressed.

17. A circuit according to claim 11, wherein the motor is a DC motor, wherein the control variable signal is a pulse-width modulated signal, and wherein the means for driving the motor selectively connects the motor to a power source in response to the control variable speed.

18. A circuit according to claim 11, wherein the motor is a DC motor.

* * * * *

UNITED STATES PATENT AND TRADEMARK OFFICE
CERTIFICATE OF CORRECTION

PATENT NO.    : 6,323,611 B1
DATED         : November 27, 2001
INVENTOR(S)   : Kessler It is certified that error appears in the above-identified patent and that said Letters Patent is hereby corrected as shown below:

<u>Title page,</u>
Item [*], Notice, delete "490" and insert -- 981 --.

Signed and Sealed this

First Day of July, 2003

JAMES E. ROGAN
*Director of the United States Patent and Trademark Office*